3,309,404
DERIVATIVES OF DIBENZOCYCLOHEPTENES AND A PROCESS FOR THEIR PREPARATION

Edward L. Engelhardt, Gwynedd Valley, Pa., assignor to Merck & Co., Inc., Rahway, N.J., a corporation of New Jersey
No Drawing. Filed Aug. 1, 1963, Ser. No. 299,155
16 Claims. (Cl. 260—556)

This application is a continuation-in-part of my copending application Ser. No. 261,860, filed Feb. 28, 1963, which in turn is a continuation-in-part of application Ser. No. 184,915, filed Apr. 4, 1962, which in turn is a continuation-in-part of application Ser. No. 140,222, filed Sept. 25, 1961, all now abandoned.

This invention relates to a process for the production of 5H-dibenzo[a,d]cycloheptenes and 10,11-dihydro-5H-dibenzo[a,d]cycloheptenes which are substituted at the 5-carbon atom with a tertiary aminopropyl or tertiary aminopropynyl radical and to certain novel compounds produced by said process. The process of the invention may be represented as follows:

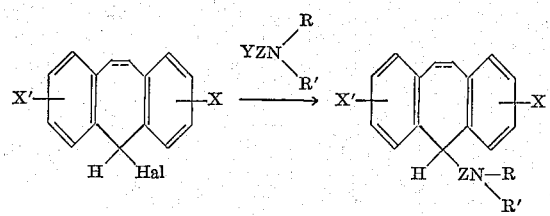

in which Y represents lithium or Hal-Mg wherein Hal is a halogen, preferably chlorine or bromine, Z is a radical selected from the group consisting of —CH$_2$CH$_2$CH$_2$— and —C≡CCH$_2$—, R and R' are similar or dissimilar and may be an alkyl radical having up to 6 carbons, either straight or branched chain, or cycloalkyl having up to 8 carbons or phenyl including phenyl substituted with halogens, alkyl or alkoxy groups or aralkyl such as benzyl, provided that when R and R' are other than alkyl radicals the total number of carbon atoms in R and R' does not exceed nine; where R and R' are lower alkyl radicals, they may be linked together through an atom selected from the group consisting of carbon, nitrogen and oxygen to form a heterocyclic ring having from five to six atoms therein such as 1-piperidyl, 1-pyrrolidyl, 4-morpholinyl and 1-loweralkyl-4-piperazinyl; X and X' are similar or dissimilar and are selected from hydrogen, an alkyl group having up to 6 carbon atoms, an alkenyl group having up to 6 carbon atoms, a perfluoroalkyl group having up to 4 carbon atoms, phenyl, a dialkylamino group having up to 8 carbon atoms, halogen (fluorine, chlorine, bromine or iodine), an alkoxyl group having up to 4 carbon atoms, a perfluoroalkoxyl group having up to 4 carbon atoms, a dialkylcarbamyl group having up to 9 carbon atoms, an alkylmercapto group having up to 4 carbon atoms, a perfluoroalkylmercapto group having up to 4 carbon atoms, an alkylsulfonyl group having up to 4 carbon atoms, a perfluoroalkylsulfonyl group having up to 4 carbon atoms, or a dialkylsulfamyl group having up to 8 carbon atoms. More than one of these substitutents may be on each benzenoid ring. The compounds may have substituents on the Z chain such as lower alkyl radicals, preferably having from 1 to 4 carbon atoms.

The dotted line between the 10 and 11 carbon atoms indicates that the compounds may be saturated or unsaturated at this location, the saturated compound being identified by the 10,11-dihydro designation.

The starting compound, namely, the 5-halo-5H-dibenzo[a,d]cycloheptene or its 10,11-dihydro derivative, either of which may be further substituted by X and X' as defined above, may be made by using the process described by G. Berti in Gazz. Chim. Ital., 87, 293–309 (1957).

The Grignard or lithium reagent may be prepared by employing conventional procedures. The Grignard reagent may be prepared in a conventional solvent such as ether, tetrahydropyran, 2-methyltetrahydrofuran and tetrahydrofuran and the like, but tetrahydrofuran is preferred. The lithium reagent may be prepared in a conventional solvent. The preferred solvent is ether; however, other solvents such as dibutyl ether, benzene and the like may be used. These solvents may remain present during the reaction.

As the reaction is exothermic, the reactants should be added together very slowly or they may be combined more rapidly if external cooling is applied to the reaction vessel so as to maintain the temperature close to that of the room. When the addition is completed, heat is applied to maintain the temperature at up to refluxing temperature for from 15 to 60 minutes to obtain the maximum yield. The solvent can be removed by distilling it off under reduced pressure. The mixture is diluted with benzene and the excess Grignard reagent is hydrolyzed. As the desired end product is soluble in benzene, this layer is separated and the product isolated therefrom.

Further purification can be achieved by extraction with dilute acid which is then neutralized with alkali. The product is recovered therefrom with a solvent such as benzene or hexane which is then evaporated off. The base of the product can be converted to a salt by the addition of such commonly used acids as hydrochloric acid, phosphoric acid, acetic acid, maleic acid and the like. To make the hydrochloride salt, it is preferable to add hydrogen chloride gas to a solution of the end product in a mixture of dry alcohol and ether.

The compounds of the invention are useful as antihistamines, in the treatment of mental disease in that they are anti-depressants and serve as mood elevators or psychic energizers, and as intermediates for the preparation of secondary amines, some of which are members of a class having pharmacological activity. For therapeutic purposes, they may be administered in any of the usual pharmaceutical forms such as powders, capsules, tablets, elixirs, solutions and aqueous suspensions. The daily dosage is within the range of from about 5 mg. to about 250 mg., preferably taken in divided amounts over the day. The compounds are preferably administered in the form of their acid addition salts and these salts are included within the scope of this invention.

The invention will be further clarified by the following representative illustrations.

EXAMPLE 1.—5 - (3 - DIMETHYLAMINOPROPYL)-5H - DIBENZO[a,d]CYCLOHEPTENE HYDROCHLORIDE

*Step A.—Preparation of 3-dimethylaminopropylmagnesium chloride*

Magnesium turnings (1.08 g., 0.0442 g. atom) are placed in a 200 ml. 3-necked flask equipped with a stirrer, a dropping funnel and a reflux condenser carrying a drying tube. An atmosphere of dry nitrogen is maintained in the apparatus throughout the reaction. A crystal of iodine is added followed by 10 ml. of dry tetrahydrofuran. A 3 ml. portion of 3-dimethylaminopropylmagnesium chloride solution from a previous experiment is added and the mixture heated to refluxing on the steam-bath. A solution of 3-dimethylaminopropyl chloride (5.37 g., 0.0442 mole) in 35 ml. of dry tetrahydrofuran is added dropwise, refluxing being maintained by the application of heat when necessary. When the addition is complete, the mixture is refluxed for 2 hours when almost all of the magnesium is dissolved.

Instead of using 3-dimethylaminopropylmagnesium chloride to initiate the reaction, ethyl bromide can be em- Utilizing the above procedure, the products enumerated below are obtained employing the designated reactants.

| Grignard Reagent | Cycloheptene | Product |
| --- | --- | --- |
| 3-diethylaminopropylmagnesium chloride | 5-chloro-5H-dibenzo[a,d]cycloheptene | 5-(3-diethylamino-propyl)-5H-dibenzo[a,d]cycloheptene. |
| 3-di-n-propylaminopropylmagnesium chloride. | 5-chloro-5H-dibenzo[a,d]cycloheptene | 5-(3-di-n-propylaminopropyl)-5H-dibenzo[a,d]cycloheptene. |
| 3-di-n-butylaminopropylmagnesium chloride. | 5-chloro-10,11-dihydro-5H-dibenzo[a,d]cycloheptene. | 5-(3-di-n-butylaminopropyl)-10,11-dihydro-5H-dibenzo[a,d]cycloheptene. |
| 3-dimethylamino-2-methyl propylmagnesium chloride. | 5-chloro-5H-dibenzo[a,d]cycloheptene | 5-(3-dimethylamino-2-methylpropyl)-5H-dibenzo[a,d]cycloheptene. |
| 3-diethylaminopropylmagnesium chloride | 5-chloro-3-methylsulfonyl-5H-dibenzo[a,d]cycloheptene. | 5-(3-diethylaminopropyl)-3-methylsulfonyl-5H-dibenzo[a,d]cycloheptene. | ployed in a quantity of 0.05 mole per mole of magnesium.

Utilizing this procedure and employing 3-diethylaminopropyl chloride, 3-di-n-propylaminopropyl chloride and 3-di-n-butylaminopropyl chloride in place of 3-dimethylaminopropyl chloride, there is obtained the corresponding 3-diloweralkylaminopropylmagnesium chloride.

*Step B.—Preparation of 5-(3-dimethylaminopropyl)-5H-dibenzo[a,d]cycloheptene hydrochloride*

The Grignard solution prepared in Step A is cooled to room temperature and stirred while a solution of 5.05 g. (0.0221 mole) of 5-chloro-5H-dibenzo[a,d]cycloheptene in 25 ml. of dry tetrahydrofuran is added dropwise, external cooling being applied as required to maintain the temperature close to room temperature. When the addition is complete, the mixture is heated to refluxing for 15 minutes. The bulk of the tetrahydrofuran then is distilled under reduced pressure, keeping the water-bath temperature at 50–60° C. The syrupy residue is dissolved in 75 ml. of benzene and water, 15 ml. is added dropwise with stirring. The benzene layer is decanted from the gelatinous precipitate which then is re-extracted with three 20 ml. portions of boiling benzene. The combined benzene extracts are washed with water and extracted with three 15 ml. portions of 3 N hydrochloric acid. The acid extract is made basic with sodium hydroxide and the yellow oily base that separates is extracted into hexane. After washing the combined extracts with water, the hexane is distilled and the product obtained as a yellow oil in a yield of 4.61 g. The base is converted to the hydrochloride by dissolving it in a mixture of 15 ml. of absolute alcohol and 15 ml. of absolute ether and adding 1.8 ml. of a 10.28 N solution of dry hydrogen chloride in absolute alcohol. The solution then is diluted to incipient crystallization by the addition of 25 ml. of absolute ether. The yield of 5-(3-dimethylaminopropyl)-5H - dibenzo[a,d]cycloheptene hydrochloride, M.P., 186–190° C. is 4.17 g. Recrystallization from mixtures of absolute alcohol and absolute ether gives the product M.P., 191–193° C.

*Analysis.*—Calculated for $C_{20}H_{23}N \cdot HCl$: C, 76.53; H, 7.71; N, 4.46. Found: C, 76.23; H, 7.83; N, 4.45.

EXAMPLE 2.—3-CHLORO-5-(3-DIMETHYLAMINOPROPYL) - 5H - DIBENZO[a,d]CYCLOHEPTENE HYDROGEN MALEATE

*Step A.—Preparation of 3-dimethylaminopropylmagnesium chloride*

3-dimethylaminopropylmagnesium chloride was prepared from 1.21 g. (0.05 g. atom) of magnesium and 6.1 g. (0.05 mole) of 3-dimethylaminopropyl chloride in 60 ml. of tetrahydrofuran following the procedure of Example 1, Step A.

*Step B.—Preparation of 3-chloro-5-(3-dimethylaminopropyl)-5H-dibenzo[a,d]cycloheptene hydrogen maleate*

The solution of the Grignard reagent obtained in Step A was cooled to room temperature and stirred while a solution of 6.53 g. (0.025 mole) of 3,5-dichloro-5H-dibenzo[a,d]cycloheptene in 35 ml. of tetrahydrofuran was added dropwise over a period of 25 minutes. The reaction mixture warmed up to approximately 50° C. during the addition. The reaction mixture was stirred for 2 hours at room temperature, then at reflux for 30 minutes. The product then was isolated following substantially the procedure described in Example 1, Step B. The dark yellow oily base was obtained in a yield of 6.43 g. The base was converted to the hydrobromide by treating an ether solution with anhydrous hydrogen bromide. The crude hydrobromide was reconverted to the base that was extracted into benzene, some benzene insoluble material being rejected. The recovered base weighed 4.47 g. A 4.25 g. portion of the base was dissolved in 50 ml. of isopropyl alcohol and a solution of 1.65 g. of maleic acid in isopropyl alcohol added and the product allowed to crystallize. The hydrogen maleate of the product was obtained in a yield of 4.95 g., M.P., 150–153° C. Three recrystallizations from isopropyl alcohol gave analytically pure material, M.P., 153–155° C.

*Analysis.*—Calculated for $C_{20}H_{22}ClN \cdot C_4H_4O_4$: C, 67.37; H, 6.13; N, 3.27. Found: C, 67.54; H, 6.22; N, 3.20.

In similar manner, utilizing the above procedure, the products enumerated below are obtained using the designated reactants.

| Grignard Reagent | Cycloheptene | Product |
| --- | --- | --- |
| 3-diethylaminopropylmagnesium chloride | 3,5-dichloro-5H-dibenzo[a,d]cycloheptene | 3-chloro-5-(3-diethylaminopropyl)-5H-dibenzo[a,d]cycloheptene. |
| 3-di-n-propylaminopropylmagnesium chloride. | 3,5-dichloro-5H-dibenzo[a,d]cycloheptene | 3-chloro-5-(3-di-n-propylaminopropyl)-5H-dibenzo[a,d]cycloheptene. |
| 3-di-n-butylaminopropylmagnesium chloride | 3,5-dichloro-10,11-dihydro-5H-dibenzo[a,d]cycloheptene. | 3-chloro-5-(3-di-n-butylaminopropyl)-10,11-dihydro-5H-dibenzo[a,d]cycloheptene. |
| 3-dimethylaminopropylmagnesium chloride. | 3-bromo-5-chloro-5H-dibenzo[a,d]cycloheptene. | 3-bromo-5-(3-dimethylaminopropyl)-5H-dibenzo[a,d]cycloheptene. |
| 3-diethylaminopropylmagensium chloride | 5-chloro-3-methoxy-5H-dibenzo[a,d]cycloheptene. | 5-(3-diethylaminopropyl)-3-methoxy-5H-dibenzo[a,d]cycloheptene. |
| 3-di-n-propylaminopropylmagnesium chloride. | 5-chloro-3-methylmercapto-5H-dibenzo[a,d]cycloheptene. | 5-(3-di-n-propylaminopropyl)-3-methylmercapto-5H-dibenzo[a,d]cycloheptene. |
| 3-dimethylaminopropylmagnesium chloride. | 5-chloro-3-methylsulfonyl-5H-dibenzo[a,d]cycloheptene. | 5-(3-dimethylaminopropyl)-3-methylsulfonyl-5H-dibenzo[a,d]cycloheptene. |
| 3-dimethylaminopropylmagnesium chloride. | 5-chloro-10,11-dihydro-3-methylsulfonyl-5H-dibenzo[a,d]cycloheptene. | 5-(3-dimethylaminopropyl)-10,11-dihydro-3-methylsulfonyl-5H-dibenzo[a,d]cycloheptene. |

EXAMPLE 3.—3-CHLORO - 5 - [3-(1 - METHYL-4-PIPERAZINYL) - PROPYL] - 5H - DIBENZO - [a,d] CYCLOHEPTENE

Step A.—Preparation of 1-methyl-4-piperazinylpropylmagnesium chloride

Magnesium turnings (1.21 g., 0.05 g. atom) were placed in a 200 ml. three-necked flask equipped with a stirrer, a dropping funnel and a reflux condenser carrying a drying tube. An atmosphere of dry nitrogen was maintained throughout the experiment. The magnesium was covered with 5 ml. of dry tetrahydrofuran and 0.4 ml. of ethyl bromide was added. When the reaction between the magnesium and the ethyl bromide had subsided, the mixture was heated to refluxing on the steam-bath and stirred while a solution of 9.7 g. (0.0548 mole) of 3-(1-methyl-4-piperazinyl)-propyl chloride in tetrahydrofuran (volume of solution, 40 ml.) was added dropwise, heat being applied as required to maintain refluxing. The addition required 15 minutes. The reaction mixture then was heated to refluxing on the steam-bath for 1 hour when all but a trace of magnesium had dissolved.

Using the above procedure, and employing 3-(1-piperidyl)-propyl chloride, 3-(4-morpholinyl)-propyl chloride, 3-(1-pyrrolidyl)-propyl chloride, 3-(N-benzyl-N-methylamino) - propyl chloride, 3 - (N - ethyl - N-phenylamino)-propyl chloride and 3-(N-cyclopentyl-N-methylamino)-propyl chloride in place of 3-(1-methyl-4-piperazinyl)-propyl chloride, there is obtained the corresponding 3-substituted-propylmagnesium chloride.

Step B.—Preparation of 3-chloro-5-[3-(1-methyl-4-piperazinyl)-propyl]-5H-dibenzo[a,d]cycloheptene The solution of the Grignard reagent obtained in Step A was cooled to room temperature and stirred while a solution of 6.53 g. (0.025 mole) of 3,5-dichloro-5H-dibenzo[a,d]cycloheptene in 35 ml. of tetrahydrofuran was added dropwise over a period of 15 minutes. The mixture became warm and yellow in color. The mixture was stirred for 1 hour at room temperature, then at reflux for 30 minutes. The bulk of the solvent then was distilled under reduced pressure, keeping the bath temperature below 50° C. and the residue taken up in 50 ml. of benzene. The solution was cooled in an ice-bath and the excess Grignard reagent hydrolyzed by the dropwise addition of 20 ml. of water. After extracting with boiling benzene, the combined benzene extracts were washed with water and the basic material extracted into dilute (2 N) hydrochloric acid. The acid extract was made basic with sodium hydroxide and the liberated base extracted into hexane. After washing with water and drying over sodium sulfate, the solvent was evaporated, leaving 6.68 g. of the oily base. The base was dissolved in 20 ml. of absolute alcohol and converted to the dihydrochloride by adding 3.8 ml. of a 10.28N solution of dry hydrogen chloride in absolute alcohol. The crude product, M.P., 231–235° C., weighed 6.44 g. The dihydrochloride was recrystallized successively from absolute alcohol, isopropyl alcohol, dry acetonitrile and finally isopropyl alcohol. The pure material melted at 239–240° C.

Analysis.—Calculated for $C_{23}H_{27}ClN$: C, 62.79; H, 6.64; N, 6.37; Cl, 24.18. Found: C, 63.06; H, 6.57; N, 6.33; Cl, 23.97.

Following the above procedure, the products enumerated below are obtained using the designated reactants.

| Grignard Reagent | Cycloheptene | Product |
| --- | --- | --- |
| 3-(1-n-propyl-4-piperazinyl)-propylmagnesium chloride. | 3,5-dichloro-5H-dibenzo[a,d]cycloheptene. | 3-chloro-5-[3-(1-n-propyl-4-piperazinyl)-propyl]-5H-dibenzo[a,d]cycloheptene. |
| 3-(1-pyrrolidyl)-propylmagnesium chloride. | 3,5-dichloro-10,11-dihydro-5H-dibenzo[a,d]cycloheptene. | 3-chloro-5-[3-(1-pyrrolidyl)-propyl]-10,11-dihydro-5H-dibenzo[a,d]cycloheptene. |
| 3-(1-piperidyl)-propylmagnesium chloride. | 3-bromo-5-chloro-5H-dibenzo[a,d]-cycloheptene. | 3-bromo-5-[3-(1-piperidyl)-propyl]-5H-dibenzo[a,d]cycloheptene. |
| 3-(1-ethyl-4-piperazinyl)-prop lmagnesium chloride. | 5-chloro-3-methoxy-5H-dibenzo[a,d]-cycloheptene. | 5-[3-(1-ethyl-4-piperazinyl)-propyl]-3-methoxy-5H-dibenzo[a,d]cycloheptene. |
| 3-(N-ethyl-N-methylamino)-propylmagnesium chloride. | 5-chloro-3-methylmercapto-5H-dibenzo[a,d]cycloheptene. | 5-[3-(N-ethyl-N-methylamino)-propyl]-3-methylmercapto-5H-dibenzo[a,d]cycloheptene. |
| 3-(4-morpholinyl)-propylmagnesium chloride. | 5-chloro-3-methylsulfonyl-5H-dibenzo[a,d]cycloheptene. | 3-methylsulfonyl-5-[3-(4-morpholinyl)-propyl]-5H-dibenzo[a,d]cycloheptene. |
| 3-(1-methyl-4-piperazinyl)-propylmagnesium chloride. | 5-chloro-5H-dibenzo[a,d]cycloheptene. | 5-[3-(1-methyl-4-piperazinyl)-propyl]-5H-dibenzo[a,d]cycloheptene. |
| 3-(1-methyl-4-piperazinyl)-propylmagnesium chloride. | 5-chloro-10,11-dihydro-5H-dibenzo[a,d]cycloheptene. | 5-[3-(1-methyl-4-piperazinyl)-propyl]-10,11-dihydro-5H-dibenzo[a,d]cycloheptene. |
| 3-(1-pyrrolidyl)-propylmagnesium chloride. | 5-chloro-5H-dibenzo[a,d]cycloheptene. | 5-[3-(1-pyrrolidyl)-propyl]-5H-dibenzo[a,d]cycloheptene. |
| 3-(1-pyrrolidyl)-propylmagnesium chloride. | 5-chloro-10,11-dihydro-5H-dibenzo-[a,d]cycloheptene. | 5-[3-(1-pyrrolidyl)-propyl]-10,11-dihydro-5H-dibenzo[a,d]cycloheptene. |
| 3-(N-ethyl-N-methylamino)-propylmagnesium chloride. | 5-chloro-5H-dibenzo[a,d]cycloheptene. | 5-[3-(N-ethyl-N-methylamino)-propyl]-5H-dibenzo[a,d]cycloheptene. |
| 3-(N-benzyl-N-methylamino)-propylmagnesium chloride. | 5-chloro-5H-dibenzo[a,d]cycloheptene. | 5-[3-(N-benzyl-N-methylamino)-propyl]-5H-dibenzo[a,d]cycloheptene. |
| 3-(N-ethyl-N-phenylamino)-propylmagnesium chloride | 5-chloro-5H-dibenzo[a,d]cycloheptene. | 5-[3-(N-ethyl-N-phenylamino)-propyl]-5H-dibenzo[a,d]cycloheptene. |
| 3-(N-cyclopentyl-N-methylamino)-propylmagnesium chloride. | 5-chloro-10,11-dihydro-5H-dibenzo[a,d]cycloheptene. | 5-[3-(N-cyclopentyl-N-methylamino)-propyl]-10,11-dihydro-5H-dibenzo[a,d]cycloheptene. |

EXAMPLE 4

To obtain the end product in which R and R' as above defined are other than those of the above examples, the Grignard reagent is prepared employing the corresponding tertiary aminopropyl halide. The procedure of Steps A in the above examples should be followed.

EXAMPLE 5

By starting with a dibenzo[a,d]cycloheptene having X and X' as one or more of the substituents enumerated above, instead of the 3-chloro derivative in Example 2, and following the procedure of that example, the correspondingly substituted end product is obtained.

EXAMPLE 6.—5 - (3 - DIMETHYLAMINOPROPYL)-10,11-DIHYDRO - 5H - DIBENZO[a,d]CYCLOHEPTENE

This compound is obtained by following the procedure of Example 1, but starting with 5-chloro-10,11-dihydro-5H-dibenzo[a,d]cycloheptene as the starting compound.

EXAMPLE 7

By starting with the appropriate compound in which X and X' are as above defined and R and R' are as above defined and following the steps of Examples 2 to 5 as they apply, the desired substituted end product in the 10,11-dihydro series is obtained.

EXAMPLE 8.—5 - (3 - DIMETHYLAMINOPROPYL)-3 - METHYLSULFONYL - 5H - DIBENZO[a,d]CYCLOHEPTENE

Step A.—Preparation of cuprous methylmercaptide

Concentrated ammonium hydroxide solution, 300 ml., is placed in a 1 liter, 3-necked flask fitted with a stirrer and gas inlet tube. The apparatus is cooled in an ice-bath and flushed with dry nitrogen while 40.0 g. (0.40 mole) of cuprous chloride is added portion-wise with stirring. To the dark blue solution is added 95% ethanol, 300 ml., and then methylmercaptan is bubbled into the cooled solution until precipitation is complete and the supernatant solution becomes yellow. The solid is collected and washed by centrifugation with four portions of dilute ammonium hydroxide solution, followed by four portions of absolute ethanol. The yellow product is dried under reduced pressure at 45–50° C. and finally in a vacuum desiccator over concentrated sulfuric acid. The yield of product is 41.4 g. (93%).

Step B.—Preparation of 3-methylmercapto-5H-dibenzo[a,d]cyclohepten-5-one 3-bromo-5H-dibenzo[a,d]cyclohepten-5-one, 7.93 g. (0.028 mole), and cuprous methylmercaptide, 4.01 g. (0.036 mole), prepared as described in Step A, are put in a 100 ml. flask fitted with a stirrer and reflux condenser. Quinoline, 44.8 ml., and pyridine, 4.0 ml., are added and the slurry is heated at 200° C. with stirring for six hours. The reaction mixture is poured into 6 N hydrochloric acid, 120 ml., and ice and extracted with five 150 ml. portions of boiling benzene. The combined extracts are wash with three 200 ml. portions of 3 N hydrochloric acid. After washing with water, the solvent is evaporated under reduced pressure leaving a brown oil, weight 7.41 g., as residue. The oil is dissolved in absolute methanol, 125 ml., and boiled with 370 mg. decolorizing carbon for thirty minutes. The filtrate is concentrated to 60 ml. and a yellow solid separates, along with a brown oil. The solid is mechanically separated from the oil and dried in a vacuum desiccator over concentrated sulfuric acid. The product weighs 2.77 g. and melts at 66.5–67.5° C. The brown oil is evaporatively distilled at 146° C./0.1 mm. and the sublimate is crystallized from 25 ml. of absolute methanol to give 2.65 g. of material melting at 66.5–67.5° C. (77% yield).

*Analysis.*—Calculated for $C_{16}H_{12}OS$: C, 76.16; H, 4.80; S, 12.71. Found: C, 76.35; H, 4.61; S, 12.60.

Step C.—3-methylmercapto-5H-dibenzo[a,d]cyclohepten-5-ol 3-methylmercapto-5H-dibenzo[a,d]cyclohepten-5-one, 27.9 g. (0.11 mole), is dissolved in 500 ml. of methanol. The solutiton is stirred and heated to refluxing while a solution of 14.9 g. (0.276 mole) of potassium borohydride in 150 ml. of water containing 0.2 ml. of 10 N sodium hydroxide is added dropwise. After stirring at reflux for 2 hours, the solution is chilled and the precipitated product collected and washed with methanol yielding, typically, 27 g. (96%). An analytical sample melts at 117–118.5° C. after repeated recrystallizations from methanol.

*Analysis.*—Calculated for $C_{16}H_{14}OS$: C, 75.58; H, 5.55. Found: C, 74.70; H, 5.56.

Step D.—5-chloro-3-methylmercapto-5H-dibenzo[a,d]cycloheptene

A solution of 18 g. (0.071 mole) of 3-methylmercapto-5H-dibenzo[a,d]cyclohepten-5-ol in 90 ml. of dry dioxane is cooled in an ice-bath and saturated with dry hydrogen chloride. A solid separates and when precipitation appears to be complete, the mixture is stirred with 150 ml. of petroleum ether and the product collected, washed with petroleum ether, and dried in a vacuum desiccator over potassium hydroxide. The yield of 5-chloro-3-methylmercapto-5H-dibenzo[a,d]cycloheptene is 16 g. (84%), M.P. 135–138° C. The melting point is unchanged by recrystallization from cyclohexane.

*Analysis.*—Calculated for $C_{16}H_{13}ClS$: C, 70.44; H, 4.80 Found: C, 70.19; H, 4.81.

Step E.—5-(3-dimethylaminopropyl)-3-methylmercapto-5H-dibenzo[a,d]cycloheptene The Grignard reagent is prepared from dimethylaminopropyl chloride (0.2 mole) and magnesium (0.2 g. atom) in 75 ml. of dry tetrahydrofuran following the method described in U.S. Patent No. 2,996,503. A 15 ml. portion of this solution is cooled in an ice-bath and stirred while a solution of 4.7 g. (0.0172 mole) of 5-chloro-3-methylmercapto-5H-dibenzo[a,d]cycloheptene in 25 ml. of tetrahydrofuran is added dropwise. The usual precautions, such as careful drying of the apparatus and maintaining a nitrogen atmosphere, are observed. After stirring the mixture for 2 hours at room temperature, the bulk of the solvent is distilled at 30° C. under reduced pressure and the residue dissolved in benzene. The solution is cooled in an ice-bath and the excess Grignard reagent hydrolyzed by the dropwise addition of water. The benzene layer is decanted and the gelatinous precipitate washed with four 25 ml. portions of boiling benzene. After washing with water, the combined benzene solutions are extracted with 50 ml. of 0.5 M citric acid. The acid extract is rendered alkaline with sodium hydroxide and the oily base extracted into benzene. Evaporation of the washed benzene extract under reduced pressure leaves 5-(3-dimethylaminopropyl)-3-methylmercapto-5H-dibenzo[a,d]cycloheptene as the oily residue weighing, typically, 4.2 g. (75%).

Step F.—5-(3-dimethylaminopropyl)-3-methylsulfonyl-5H-dibenzo[a,d]cycloheptene 5-(3-dimethylaminopropyl)-3-methylmercapto-5H-dibenzo[a,d]cycloheptene, 1.6 g. (0.005 mole), is dissolved in 16 ml. of glacial acetic acid. The solution is cooled in an ice-bath to 15° C. and stirred while hydrogen peroxide, 2 ml. of 30%, is added dropwise. The ice-bath then is removed and the solution stirred while it warms to room temperature and then allowed to stand for 65 hours. The solution is cooled in an ice-bath and stirred while sulfur dioxide is introduced for 1 hour. After dilution with an equal volume of water and with stirring and cooling, the mixture is rendered alkaline with sodium hydroxide and the oily base extracted into benzene. Solvent is evaporated from the washed benzene extract under reduced pressure, leaving the product as a viscous oily residue in a yield of 1.75 g. (93%). The base may be converted to the hydrogen oxalate salt by treating a solution in ethanol with an equimolar quantity of oxalic acid dissolved in ethanol. 5-(3-dimethylaminopropyl)-3-methylsulfonyl-5H-dibenzo[a,d]cycloheptene hydrogen oxalate separates as a white crystalline solid, M.P. 191–192° C. dec. The melting point is unchanged by recrystallization from ethanol.

*Analysis.*—Calculated for $C_{21}H_{25}NO_2S \cdot C_2H_2O_4$: C, 62.00; H, 6.11; N, 3.15. Found: C, 61.74; H, 5.95; N, 3.07.

EXAMPLE 9.—3-CHLORO-5-(3-DIETHYLAMINO-1-PROPYNYL)-5H-DIBENZO[a,d]CYCLOHEPTENE

Step A.—Preparation of 3-diethylamino-1-propynyllithium

A solution of phenyllithium in absolute ether, 40 ml., was prepared from 0.73 g. (0.105 g. atom) of lithium and 7.85 g. (0.05 mole) of bromobenzene by the method described by H. Gilman in "Organic Reactions," John Wiley & Sons, Inc. (1954), vol. VIII, p. 286. A nitrogen atmosphere was maintained in the reaction vessel throughout. A solution of 3.1 g. (0.0279 mole) of 3-diethylaminopropyne-1 in 10 ml. of absolute ether was added dropwise over a period of 15 minutes. The resulting mixture was stirred at reflux for 1 hour and then cooled to room temperature.

Utilizing this procedure and employing the various other 3-substituted aminopropynes wherein R and R′ are as defined hereinabove in place of 3-diethylaminopropyne-1, there is obtained the corresponding 3-substituted amino-1-propynyllithium compound.

*Step B.—Preparation of 3-chloro-5-(3-diethylamino-1-propynyl)-5H-dibenzo[a,d]cycloheptene*

To the solution obtained from Step A was added dropwise a solution of 5.2 g. (0.02 mole) of 3,5-dichloro-5H-dibenzo[a,d]cycloheptene in a mixture of 40 ml. of dry benzene and 25 ml. of absolute ether over a period of 15 minutes. The mixture was stirred at reflux for 1½ hours, then allowed to stand overnight. The reaction mixture was cooled in an ice-bath and the excess organolithium reagent hydrolyzed by the addition of water. The ether layer was separated and extracted with dilute hydrochloric acid until the extracts were no longer colored. The combined acid extracts were made basic and the red-yellow oil that separated extracted into ether. After washing with water, the extract was dried over anhydrous sodium sulfate and the ether evaporated, leaving 4.61 g. of the oily base, 3-chloro-5-(3-diethylamino-1-propynyl) - 5H - dibenzo[a,d]cycloheptene. The base, 4.05 g., was dissolved in 20 ml. of isopropyl alcohol and the solution treated with 1.15 g. of oxalic acid. The yield of white crystalline 3-chloro-5-(3-diethylamino - 1 - propynyl)-5H - dibenzo[a,d]cycloheptene hydrogen oxalate, M.P., 156–158° C., was 4.31 g. It melted at 167–168° C. after repeated crystallizations from isopropyl alcohol and mixtures of absolute ethanol and absolute ether.

*Analysis.*—Calculated for $C_{22}H_{22}NCl \cdot C_2H_2O_4$: C, 67.69; H, 5.68; N, 3.29. Found: C, 67.38; H, 5.94; N, 3.31.

Utilizing the above procedure, the products enumerated below are obtained using the designated reactants.

poured cautiously with stirring into 1.5 kg. of crushed ice, and allowed to stand overnight at room temperature. The brown solid is collected, washed with water, dried in a vacuum desiccator over sodium hydroxide, and then extracted in a Sohxlet extractor with 700 ml. of boiling cyclohexane for 16 hours. On cooling, the cyclohexane extract deposits 11.65 g. (53%) of 3-bromo-7-fluorosulfonyl-10,11-dihydro - 5H - dibenzo[a,d]cyclohepten-5-one as dark yellow flakes, M.P. 148–151° C. Recrystallizations from ether and cyclohexane give an analytical sample, M.P. 150–152° C.

*Analysis.*—Calculated for $C_{15}H_{10}O_3FBrS$: C, 48.79; H, 2.73; S, 8.69. Found: C, 48.78; H, 2.83; S, 8.87.

*Step B.—3-bromo-7-dimethylsulfamoyl-10,11-dihydro-5H-dibenzo[a.d]cyclohepten-5-one*

3 - bromo - 7 - fluorosulfonyl - 10,11 - dihydro - 5H-dibenzo[a,d]cyclohepten-5-one (2.5 g., 0.00677 mole) together with 30 ml. of 25% aqueous dimethylamine and 30 ml. of p-dioxane is heated to refluxing for 3 hours. The brown solution is evaporated to dryness under reduced pressure and the residue partitioned between benzene and water. After washing with water, the benzene layer is evaporated to dryness under reduced pressure, leaving 3-bromo-7-dimethylsulfamoyl-10,11-dihydro - 5H-dibenzo[a,d]cyclohepten-5-one as a tan solid, M.P. 142–145° C., in a yield of 2.1 g. (80%). An analytical sample melts at 146–148° C. after crystallizations from mixtures of benzene and hexane and from methanol.

*Analysis.*—Calculated for $C_{17}H_{16}O_3NBrS$: C, 51.78; H, 4.09; N, 3.55. Found: C, 51.71; H, 4.12; N, 3.53.

| Grignard Reagent | Cycloheptene | Product |
| --- | --- | --- |
| 3-diethylamino-1-propynyllithium | 5-chloro-5H-dibenzo[a,d]cycloheptene | 5-(3-diethylamino-1-propynyl)-5H-dibenzo[a,d]cycloheptene. |
| 3-di-n-propylamino-1-propynyllithium | 5-chloro-5H-dibenzo[a,d]cycloheptene | 5-(3-di-n-propylamino-1-propynyl)-5H-dibenzo[a,d]cycloheptene. |
| 3-di-n-butylamino-1-propynyllithium | 5-chloro-10,11-dihydro-5H-dibenzo[a,d]cycloheptene. | 5-(3-di-n-butylamino-1-propynyl)-10,11-dihydro-5H-dibenzo[a,d]cycloheptene. |
| 3-dimethylamino-3-methyl-1-propynyl-lithium. | 5-chloro-5H-dibenzo[a,d]cycloheptene | 5-(3-dimethylamino-3-methyl-1-propynyl)-5H-dibenzo[a,d]cycloheptene. |
| 3-(1-n-propyl-4-piperazinyl)-1-propynyl-lithium. | 3,5-dichloro-5H-dibenzo[a,d]cycloheptene | 3-chloro-5-[3-(1-n-propyl-4-piperazinyl)-1-propynyl]-5H-dibenzo[a,d]cycloheptene. |
| 3-(1-pyrrolidyl)-1-propynyllithium | 3,5-dichloro-10,11-dihydro-5H-dibenzo[a,d] cycloheptene. | 3-chloro-5-[3-(1-pyrrolidyl)-1-propynyl]-10,11-dihydro-5H-dibenzo[a,d]cycloheptene. |
| 3-(1-piperidyl)-1-propynyllithium | 3-bromo-5-chloro-5H-dibenzo[a,d]cycloheptene. | 3-bromo-5-[3-(1-piperidyl)-1-propynyl]-5H-dibenzo[a,d]cycloheptene. |
| 3-(1-ethyl-4-piperazinyl)-1-propynyllithium. | 5-chloro-3-methoxy-5H-dibenzo[a,d]cycloheptene. | 5-[3-(1-ethyl-4-piperazinyl)-1-propynyl]-3-methoxy-5H-dibenzo[a,d]cycloheptane. |
| 3-(N-ethyl-N-methylamino)-1-propynyl-lithium. | 5-chloro-3-methyl-mercapto-5H-dibenzo[a,d]cycloheptene. | 5-[3-N-ethyl-N-methylamino)-1-propynyl]-3-methyl-mercapto-5H-dibenzo[a,d]cycloheptene. |
| 3-(4-morpholinyl)-1-propynyllithium | 5-chloro-3-methyl-sulfonyl-5H-dibenzo-[a,d]cycloheptene. | 3-methylsulfonyl-5-[3-(4-morpholinyl)-1-propynyl]-5H-dibenzo[a,d]cycloheptene. |
| 3-(1-methyl-4-piperazinyl)-1-propynyl-lithium. | 5-chloro-5H-dibenzo[a,d]cycloheptene | 5-[3-(1-methyl-4-piperazinyl)-1-propynyl]-5H-dibenzo[a,d]cycloheptene. |
| 3-(1-methyl-4-piperazinyl)-1-propynyl-lithium. | 5-chloro-10,11-di-hydro-5H-dibenzo[a,d] cycloheptene. | 5-[3-(1-methyl-4-piperazinyl)-1-propynyl]-5H-dibenzo[a,d]cycloheptene-10,11-dihydro-5H-dibenzo[a,d]cycloheptene. |
| 3-(1-pyrrolidyl)-1-propynyllithium | 5-chloro-5H-dibenzo[a,d]cycloheptene | 5-[3-(1-pyrrolidyl)-1-propynyl]-5H-dibenzo[a,d]cycloheptene. |
| 3-(1-pyrrolidyl)-1-propynyllithium | 5-chloro-10,11-dihydro-5H-dibenzo[a,d] cycloheptene. | 5-[3-(1-pyrrolidyl)-1-propynyl]-10,11-dihydro-5H-dibenzo[a,d]cycloheptene. |
| 3-(N-ethyl-N-methylamino)-1-propynyl-lithium. | 5-chloro-5H-dibenzo[a,d]cycloheptene | 5-[3-(N-ethyl-N-methylamino)-1-propynyl]-5H-dibenzo[a,d]cycloheptene. |
| 3-(N-benzyl-N-methylamino)-1-propynyl-lithium. | 5-chloro-5H-dibenzo[a,d]cycloheptene | 5-[3-(N-benzyl-N-methylamino)-1-propynyl]-5H-dibenzo[a,d]cycloheptene. |
| 3-(N-ethyl-N-phenylamino)-1-propynyl-lithium. | 5-chloro-5H-dibenzo[a,d]cycloheptene | 5-[3-(N-ethyl-N-phenylamino)-1-propynyl]-5H-dibenzo[a,d]cycloheptene. |
| 3-(N-cyclopentyl-N-methylamino)-1-propynyllithium. | 5-chloro-10,11-dihydro-5H-dibenzo[a,d] cycloheptene. | 5-[3-(N-cyclopentyl-N-methylamino)-1-propynyl]-10,11-dihydro-5H-dibenzo[a,d]cycloheptene. |

EXAMPLE 10.—3-DIMETHYLSULFAMOYL-5-(3-DIMETHYLAMINOPROPYL)-5H - DIBENZO[a,d]CYCLOHEPTENE

*Step A.—3-bromo-7-fluorosulfonyl-10,11-dihydro-5H-dibenzo[a,d]cyclohepten-5-one*

Fluorosulfonic acid, 100 ml., is placed in a 300 ml., 3-necked round bottom flask equipped with polyethylene inlet tube and polyethylene exit tube with drying tube half-filled with anhydrous sodium fluoride. A nitrogen atmosphere is maintained throughout the reaction. With stirring, 17.0 g. (0.059 mole) of 3-bromo-10,11-dihydro-5H-dibenzo[a,d]cyclohepten - 5 - one is added in portions over 20 minutes. After stirring another 10 minutes, the dark green solution is heated on the steam-bath for 6½ hours. The mixture then is cooled to room temperature,

*Step C.—3-dimethylsulfamoyl-10,11-dihydro-5H-dibenzo[a,d]cyclohepten-5-one*

3-bromo-7-dimethylsulfamoyl-10,11 - dihydro - 5H-dibenzo[a,d]cyclohepten-5-one, 8.0 g. (0.0203 mole), is dissolved in a mixture of 100 ml. of absolute ethanol, 70 ml. of dimethylformamide, and 5 ml. of triethylamine. The solution is hydrogenated at atmospheric pressure and in the presence of 600 mg. of 10% palladium on charcoal catalyst until hydrogen uptake is complete. Catalyst is removed by filtration and washed with absolute ethanol. The filtrate is evaporated to dryness under reduced pressure and the residue triturated with benzene. The insoluble triethylamine hydrobromide is filtered and the benzene filtrate evaporated to dryness under reduced pressure. Crystallization of the residual white solid from absolute ethanol affords 6.1 g. (97%) of 3-dimethylsulfamoyl-10,11-dihydro-5H-dibenzo[a,d] cyclohepten - 5 - one, M.P. 122–124° C. The melting point is unchanged after crystallization from absolute ethanol.

Analysis.—Calculated for $C_{17}H_{17}O_3NS$: C, 64.74; H, 5.44; N, 4.44. Found: C, 64.20; H, 5.47; N, 4.16.

*Step D.—3-dimethylsulfamoyl-5H-dibenzo[a,d] cyclohepten-5-one*

A mixture of 3-dimethylsulfamoyl-10,11-dihydro-5H-dibenzo[a,d]cyclohepten-5-one (6.1 g., 0.0194 mole), N-bromosuccinimide (3.6 g., 0.029 mole), benzoyl peroxide (50 mg.) and 50 ml. of benzene is stirred and heated to refluxing for 3 hours. The precipitated succinimide is filtered and washed with warm benzene. After washing with 5% aqueous sodium hydroxide and then with water, the benzene filtrate is evaporated to dryness under reduced pressure. The residual oily solid is suspended in 75 ml. of triethylamine and the mixture stirred at reflux for 16 hours. Triethylamine is evaporated under reduced pressure and the residual solid partitioned between benzene and water. The benzene layer is separated, washed with 3 N hydrochloric acid and then with water, and evaporated to dryness under reduced pressure. Crystallization of the residual solid from 95% ethanol gives 2.83 g. (46.5%) of 3-dimethylsulfamoyl-5H-dibenzo[a,d]cyclohepten-5-one, M.P. 129.5–135.5° C. An analytical sample melts at 138.5–139.5° C. after repeated crystallizations from 95% ethanol.

Analysis.—Calculated for $C_{17}H_{15}O_3NS$: C, 65.16; H, 4.83; N, 4.47. Found: C, 64.88; H, 4.85; N, 4.11.

*Step E.—3-dimethylsulfamoyl-5H-dibenzo[a,d] cyclohepten-5-ol*

3-dimethylsulfamoyl - 5H - dibenzo[a,d]cyclohepten-5-one (6.9 g., 0.022 mole) and 100 ml. of absolute methanol are stirred and heated to refluxing. A solution of 1.6 g. (0.0296 mole) of potassium borohydride in 12 ml. of water containing 1 pellet of potassium hydroxide is added dropwise at a rate such that reflux is maintained without external heating. After another 1½ hours at reflux, the solution is evaporated ot dryness under reduced pressure. The residual white solid is suspended in water, collected, and crystallized from 95% ethanol. The yield of 3-dimethylsulfamoyl-5H-dibenzo[a,d]cyclohepten-5-ol is 6.05 g. (87%), M.P. 150–152° C. The melting point is unchanged by further recrystallization.

Analysis.—Calculated for $C_{17}H_{17}O_3NS$: C, 64.74; H, 5.44; N, 4.44. Found: C, 64.22; H, 5.44; N, 4.40.

*Step F.—5-chloro-3-dimethylsulfamoyl-5H-dibenzo [a,d]cycloheptene*

A solution of 1.0 g. (0.00317 mole) of 3-dimethylsulfamoyl-5H-dibenzo[a,d]cyclohepten-5-ol in a mixture of 2 ml. of dry dioxane and 2 ml. of absolute ether is cooled in ice and saturated with dry hydrogen chloride. The mixture is allowed to stand at room temperature for 5 hours and then is refrigerated overnight. The white crystalline product is collected, washed with petroleum ether, and dried in a vacuum desiccator over calcium chloride. The yield of 5-chloro-3-dimethylsulfamoyl-5H-dibenzo[a,d]cycloheptene is 600 mg., M.P. 139.5–143.5° C. Dilution of the mother liquor with petroleum ether gives a second crop which is recrystalized from a mixture of ether and petroleum ether affording 250 mg., M.P. 138.5–142.5 C.

Analysis.—Calculated for $C_{17}H_{16}O_2NClS$: C, 61.16; H, 4.83; N, 4.20. Found: C, 61.15; H, 4.57; N, 4.11.

*Step G.—3-dimethylsulfamoyl-5-(3-dimethylamino propyl)5H-dibenzo[a,d]cycloheptene*

By replacing the 3,5-dichloro-5H-dibenzo[a,d]cycloheptene used in Example 2, Step B, with an equimolecular amount of 5-chloro-3-(dimethylsulfamoyl)-5H-dibenzo [a,d]cycloheptene and following substantially the same procedure described in Example 2, Step B, there is obtained 3-dimethylsulfamoyl-5-(3-dimethylaminopropyl)-5H-dibenzo[a,d]cycloheptene. The yield of yellow oily base is 50%.

EXAMPLE 11.—3-DIMETHYLSULFAMOYL-5-(3-DIMETHYLAMINOPROPYL) - 10,11 - DIHYDRO-5H-DIBENZO[a,d]CYCLOHEPTENE

*Step A.—Dimethylsulfamoyl-10,11-dihydro-5H-dibenzo [a,d]cyclohepten-5-ol*

By substituting 3-dimethylsulfamoyl-10,11-dihydro-5H-dibenzo[a,d]cyclohepten - 5 - one for the 3 - dimethylsulfamoyl-5H-dibenzo[a,d]cyclohepten-5-one of Example 10, Step E, and following substantially the same procedure described therein, there is obtained 3-dimethylsulfamoyl-10,11-dihydro-5H-dibenzo[a,d]cycloheptene-5-ol.

*Step B.—5-chloro-3-dimethylsulfamoyl-10,11-dihydro-5H-dibenzo[a,d]cycloheptene*

By substituting 3-dimethylsulfamoyl-10,11-dihydro-5H-dibenzo[a,d]cyclohepten - 5 - ol for the 3 - dimethylsulfamoyl-5H-dibenzo[a,d]cyclohepten-5-ol of Example 10, Step F, there is obtained 5-chloro-3-dimethylsulfamoyl-10,11-dihydro-5H-dibenzo[a,d]cycloheptene.

*Step C.—3-dimethylsulfamoyl-5-(3-dimethylaminopropyl)-10,11-dihydro-5H-dibenzo[a,d]cycloheptene*

By substituting 5-chloro-3-dimethylsulfamoyl-10,11-dihydro-5H-dibenzo[a,d]cycloheptene for the 3,5-dichloro-5H - dibenzo[a,d]cycloheptene of Example 2, Step B, there is obtained 3-dimethylsulfamoyl-5-(3-dimethylaminopropyl)-10,11-dihydro-5H-dibenzo[a,d]cycloheptene.

I claim:
1. 3-chloro-5-(3-diethylamino - 1 - propynyl)-5H-dibenzo[a,d]cycloheptene.
2. 5-[3-(N - benzyl-N-methylamino)-1-propynyl]-5H-dibenzo[a,d]cycloheptene.
3. 5-[3-(N-benzyl-N-methylamino)-propyl] - 5H - dibenzo[a,d]cycloheptene.
4. A compound selected from the group consisting of

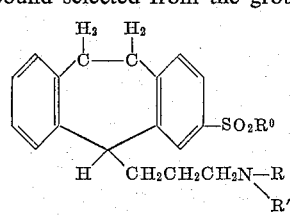

and

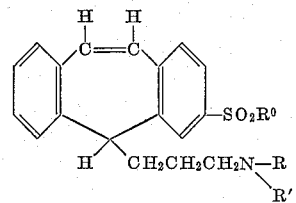

and acid addition salts thereof; wherein $R^0$ is an alkyl radical having up to 4 carbon atoms and R and R' are selected from the group consisting of an alkyl radical having up to 6 carbon atoms, cycloloweralkyl, phenyl and benzyl, provided that when R and R' are other than alkyl radicals the total number of carbon atoms in R and R' does not exceed 9 and provided further that when R and R' are both alkyl radicals, they may be linked together through an atom selected from the group consisting of carbon, nitrogen and oxygen to form a heterocyclic ring selected from the group consisting of 1-piperidyl, 4-morpholinyl, 1-pyrrolidyl and 1-loweralkyl-4-piperazinyl.

5. A 5-(3-di-loweralkylaminopropyl) - 3 - loweralkylsulfonyl-5H-dibenzo[a,d]cycloheptene.

6. 5-(3-dimethylaminopropyl) - 3 - methylsulfonyl-5H-dibenzo[a,d]cycloheptene.

7. A process for making a compound selected from the group consisting of

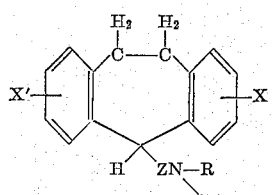

and

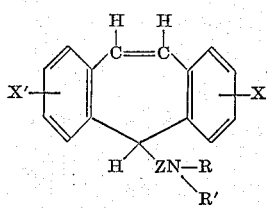

wherein Z is a radical selected from the group consisting of —$CH_2CH_2CH_2$— and —$C \equiv CCH_2$—, which radicals may be further substituted with an alkyl radical having from 1 to 4 carbon atoms; R and R' are selected from the group consisting of an alkyl radical having up to 6 carbon atoms, cycloloweralkyl, phenyl and benzyl, provided that when R and R' are other than alkyl radicals the total number of carbon atoms in R and R' does not exceed 9 and provided further that when R and R' are both alkyl radicals, they may be linked together through an atom selected from the group consisting of carbon, nitrogen and oxygen to form a heterocyclic ring selected from the group consisting of 1-piperidyl, 4-morpholinyl, 1-pyrrolidyl, and 1-loweralkyl-4-piperazinyl, and X and X' are selected from the group consisting of hydrogen, an alkyl group having up to 6 carbon atoms, an alkenyl group having up to 6 carbon atoms, a perfluoroalkyl group having up to 4 carbon atoms, a phenyl, an acyl group having up to 4 carbon atoms, a perfluoroacyl group having up to 4 carbon atoms, a dialkylamino group having up to 8 carbon atoms, halogen, an alkoxyl group having up to 4 carbon atoms, a perfluoroalkoxyl group having up to 4 carbon atoms, cyano, a dialkylcarbamyl group having up to 9 carbon atoms, an alkylmercapto group having up to 4 carbon atoms, a perfluoroalkylmercapto group having up to 4 carbon atoms, an alkylsulfonyl group having up to 4 carbon atoms, a perfluoroalkylsulfonyl group having up to 4 carbon atoms, and a dialkylsulfamyl group having up to 8 carbon atoms which comprises combining the compound

wherein Y is selected from the group consisting of lithium and Hal-Mg wherein Hal represents chlorine or bromine, Z is a radical selected from the group consisting of —$CH_2CH_2CH_2$— and —$C \equiv CCH_2$—, which radicals may be further substituted with an alkyl radical having from 1 to 4 carbon atoms, and R and R' are as above defined, with a compound selected from the group consisting of

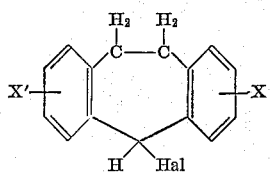

and

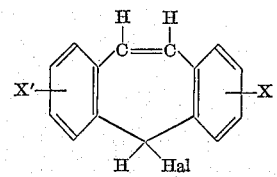

wherein Hal and X and X' are as above defined.

8. The process of claim 7 wherein the reaction is carried out in the presence of a solvent.

9. The process according to claim 7 in which heat is applied after said compounds are combined for up to one hour at a temperature up to refluxing of the solvent.

10. A compound selected from the group consisting of

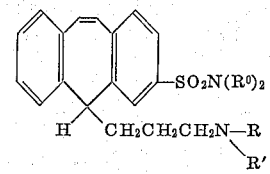

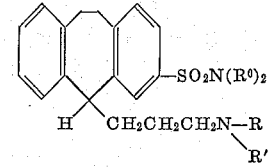

and acid addition salts thereof; wherein $R^0$ is lower alkyl and R and R' are lower alkyls.

11. 3-dimethylsulfamoyl - 5 - (3-dimethylaminopropyl) 5H-dibenzo[a,d]cycloheptene.

12. 3 - dimethylsulfamoyl-5-(3 - dimethylaminopropyl) 10,11-dihydro-5H-dibenzo[a,d]cycloheptene.

13. A compound selected from the group consisting of

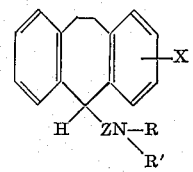

and

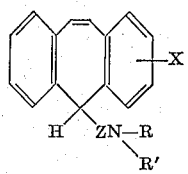

and acid addition salts thereof; wherein Z is the radical —$C \equiv CCH_2$—, which radical may be further substituted with an alkyl radical having from 1 to 4 carbon atoms; R and R' are each alkyl having up to 6 carbon atoms, cycloloweralkyl, phenyl or benzyl, provided that when R and R' are other than alkyl the total number of carbon atoms in R and R' does not exceed 9 and provided further that when R and R' are both alkyl they may form together with the nitrogen atom attached thereto the radical 1-piperidyl, 4-morpholinyl, 1-pyrrolidyl or 1-loweralkyl-4-piperazinyl; and X is hydrogen, halogen, loweralkyl, lower alkenyl, perfluoroloweralkyl, loweralkylmercapto, loweralkylsulfonyl or diloweralkylsulfamoyl.

14. A compound selected from the group consisting of

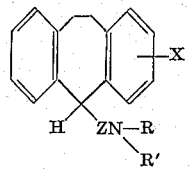

and

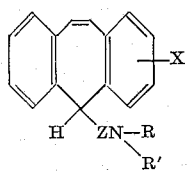

and acid addition salts thereof; wherein Z is the radical —CH$_2$CH$_2$CH$_2$—, which radical may be further substituted with an alkyl radical having from 1 to 4 carbon atoms; R is cycloloweralkyl, phenyl or benzyl; R' is alkyl having up to 6 carbon atoms or cycloloweralkyl provided that the total number of carbon atoms in R and R' does not exceed 9; and X is hydrogen, halogen, loweralkyl, loweralkenyl, perfluoroloweralkyl, loweralkylmercapto, loweralkylsulfonyl, or diloweralkylsulfamoyl.

15. The process of claim 8 wherein Hal represents chlorine.

16. The process of claim 8 wherein dimethylaminopropylmagnesium chloride is combined with 5-chloro-5H-dibenzo[a,d]cycloheptene to form the compound 5-(3-dimethylaminopropyl)-5H-dibenzo[a,d]cycloheptene.

References Cited by the Examiner

UNITED STATES PATENTS

| | | | |
|---|---|---|---|
| 2,889,322 | 6/1959 | Jacob et al. | 260—268 |
| 2,894,947 | 7/1959 | Jacob et al. | 260—268 |
| 2,951,082 | 8/1960 | Sprague et al. | 260—268 |
| 2,979,502 | 4/1961 | Gailliot et al. | 260—268 X |
| 2,985,660 | 5/1961 | Judd et al. | |
| 3,052,721 | 9/1962 | Bernstein et al. | 260—268 X |
| 3,055,890 | 9/1962 | Jacob et al. | 260—268 |
| 3,073,847 | 1/1963 | Doebel et al. | 260—268 X |
| 3,116,291 | 12/1963 | Peterson et al. | 260—268 |
| 3,126,411 | 3/1964 | Rey-Bellet et al. | 260—268 |

FOREIGN PATENTS

| | | |
|---|---|---|
| 577,057 | 9/1959 | Belgium. |
| 578,122 | 10/1959 | Belgium. |
| 584,061 | 4/1960 | Belgium. |
| 99,623 | 5/1961 | Czechoslovakia. |
| 99,624 | 5/1961 | Czechoslovakia. |
| 858,186 | 1/1961 | Great Britain. |
| 858,187 | 1/1961 | Great Britain. |
| 858,188 | 1/1961 | Great Britain. |

OTHER REFERENCES

Australian patent abstract 48,020/59, open to public inspection, October 22, 1959.

Battersby et al.: Journal Chemical Society (London), pp. 2888–2900 (1955).

Bodi et al.: Proceedings of the Federation of American Societies for Experimental Biology, vol. 19, p. 195 (1960).

Derwent Belgian Patents Reports, vol. 58A, pC21 (1959).

Derwent Belgian Patents Report, vol. 68B, pC20 (1960).

Derwent Commonwealth Patents Report, vol. 213, Gp. 3A-p. 4., Nov. 18, 1960.

German auslegeschrift 1,109,166, June 22, 1961. 5 pp. spec.

Protiva et al.: Journal Medicinal and Pharmaceutical Chemistry, pp. 411–915, vol. 4, No. 2 (1961).

Winthrop et al.: Journal Organic Chemistry, vol. 27, pp. 230–234 (1962).

ALEX MAZEL, *Primary Examiner.*

NICHOLAS S. RIZZO, HENRY R. JILES, *Examiners.*

NORMAN H. STEPNO, JAMES W. ADAMS, JR.,
*Assistant Examiners.*